United States Patent [19]

Shimizu et al.

[11] 4,443,359

[45] Apr. 17, 1984

[54] FOAM CONTROL COMPOSITIONS

[75] Inventors: Hiroshi Shimizu; Yoshisama Fukano; Minoru Yoshizawa, all of Chiba, Japan

[73] Assignee: Toray Silicone Company, Ltd., Tokyo, Japan

[21] Appl. No.: 367,185

[22] Filed: Apr. 9, 1982

[51] Int. Cl.$^3$ ............................................. B01D 19/04
[52] U.S. Cl. ..................................... 252/358; 252/321
[58] Field of Search ................................ 252/321, 358

[56] References Cited

U.S. PATENT DOCUMENTS

| | | | |
|---|---|---|---|
| 3,383,327 | 5/1968 | Sullivan | 252/321 X |
| 3,395,102 | 7/1968 | Leyshon et al. | 252/321 |
| 3,560,403 | 2/1971 | O'Hara et al. | 252/321 X |
| 3,666,681 | 5/1972 | Keil | 252/358 |

FOREIGN PATENT DOCUMENTS

| | | |
|---|---|---|
| 41184 | of 0000 | Japan . |
| 1204383 | of 0000 | United Kingdom . |
| 1468896 | of 0000 | United Kingdom . |

*Primary Examiner*—Richard D. Lovering
*Attorney, Agent, or Firm*—Andrew H. Ward

[57] ABSTRACT

A composition for controlling foam is disclosed which consists essentially of (A) an organopolysiloxane, (B) a silicon compound having the general formula $R_2SiZ_2$, wherein R is a monovalent hydrocarbon group and Z is a hydrolyzable group containing nitrogen, and (C) silica.

3 Claims, No Drawings

FOAM CONTROL COMPOSITIONS

FIELD OF THE INVENTION

The invention relates to the use of a composition, consisting essentially of (A) an organopolysiloxane, (B) a silicon compound having the general formula $R_2SiZ_2$, wherein R is a monovalent hydrocarbon group and Z is a hydrolyzable group containing nitrogen, and (C) silica, for the purpose of controlling foam.

DESCRIPTION OF PRIOR ART

Silicones have been widely used as antifoaming agents, foam preventors, and/or defoaming agents, foam reducers. However, in systems which require vigorous agitation, such as aeration vats and jet dyeing, and in alkaline solutions, such as the pulp digesting process, silicone foam control agents are not durable.

Great Britain Pat. No. 1,204,383 discloses a foam control agent consisting essentially of a dispersion of a dimethyldichlorosilane hydrophobized silica in an organopolysiloxane fluid, and Great Britian Pat. No. 1,468,896 discloses a foam control agent consisting essentially of a dispersion of a nitrogen containing organic silicon compounds hydrophobized silica in an organopolysiloxane fluid. Besides having problems with durability, these foam control agents are economically disadvantageous because a long period of time is required to make the silica hydrophobic, and a number of treatment processes are required.

Japanese patent No. Sho 52[1977]-41,184 discloses a defoaming agent composed of an organopolysiloxane, a powdered metal oxide, a filler, and amino-organofunctional silicon compounds. Besides the durability problem with this system, it also has a tendency to precipitate.

It has been found in accordance with this invention that the aforementioned problems can be alleviated with the composition of this invention which consists essentially of (A) an organopolysiloxane, (B) a silicon compound having the general formula $R_2SiZ_2$, wherein R is a monovalent hydrocarbon group and Z is a hydrolyzable group containing nitrogen, and (C) silica.

It is thus an object of this invention to provide a composition that is durable for the purpose of controlling foam, particularly for alkaline system and systems that are vigorously stirred.

DETAILED DESCRIPTION

This invention relates to the use of a composition consisting essentially of (A) an organopolysiloxane, (B) a silicon compound having the general formula $R_2SiZ_2$, wherein R is a monovalent hydrocarbon group and Z is a hydrolyzable group containing nitrogen, and (C) silica, for the purpose of controlling foam.

Specifically, this invention relates to a composition to control foaming consisting essentially of (A) 100 parts by weight of an organopolysiloxane having
  (1) at least one terminal group selected from the group consisting of alkoxy and hydroxyl groups, and
  (2) a viscosity range of 10 to 100,000 centistokes at 25° C.,
(B) 0.1 to 50 parts by weight per 100 parts by weight of Component (A) of an organic silicon compound having the general formula $R_2SiZ_2$, wherein R is an unsubstituted or substituted monovalent hydrocarbon group, and Z is a hydrolyzable group containing nitrogen, and
(C) 1 to 50 parts by weight per 100 parts by weight of Component (A) of a silica.

The organopolysiloxane employed in the present invention has the general formula $R_aSiO_{4-a/2}$ wherein R is an unsubstituted or substituted monovalent hydrocarbon group and "a" has a value of 1.9 to 2.1.

So far as is known at this time, the nature of the substituents on the organopolysiloxane are not critical. Thus, for example, any of the hydrocarbon or substituted hydrocarbon substituents normally found on silicon atoms in silicone fluids can be present. Specific examples of suitable substituents or radicals are alkyl radicals such as the methyl, ethyl, propyl, butyl, and octyl radicals; alkenyl radicals such as the vinyl and allyl radicals; aryl radicals such as the phenyl and biphenyl radicals; alkaryl radicals and aralkyl radicals such as the tolyl and benzyl radicals; and the corresponding substituted hydrocarbon radicals such as the chloropropyl, 3,3,3-trifluoropropyl, dichlorphenyl, cyanobutyl, nitrophenyl, mercaptopropyl, carboxyethyl, and aminoisobutyl radicals.

The organopolysiloxane has to have at least one terminal group selected from the group consisting of alkoxy and hydroxyl groups. Specific examples of the alkoxy group include methoxy, ethoxy, and phenoxy radicals. So far as is known at this time, the nature of the other terminal groups is not critical, but it is suggested that they be selected from the group consisting of alkoxy, hydroxyl, and triorganosilyl groups, and mixtures of thereof.

It is preferred that the organopolysiloxane be a straight chain or a partially branched straight chain. The organopolysiloxane can be simple polymers, copolymers, or mixtures thereof. Specific examples of suitable organopolysiloxanes include dimethylsiloxane, methylphenylsiloxane, methylethylsiloxane, diethylsiloxane, ethylphenylsiloxane, 3,3,3-trifluoropropylethylsiloxane, 3,3,3-trifluoropropylmethylsiloxane, and 3,3,3-trifluoropropylphenylsiloxane. It is preferred, however, that the organopolysiloxane be a hydroxyl terminated dimethylpolysiloxane from the standpoint of defoaming effects and economy.

Organopolysiloxanes with viscosities of 25° C. in the range of 10 to 100,000 centistokes can be used, but a viscosity range of 100 to 10,000 centistokes is desirable.

The organic silicon compound used in the present invention is a water hydrolyzable organic silicon compound expressed by the general formula $R_2SiZ_2$, wherein R is an unsubstituted or substituted monovalent hydrocarbon group, and Z is a hydrolyzable group containing nitrogen.

So far as is known at this time, the nature of the hydrocarbon substituent, represented by R, on the silane is not critical. Specific examples of suitable substituents or radicals include alkyl radicals such as the methyl, ethyl, and propyl radicals; alkenyl radicals such as the vinyl, allyl, and butadienyl radicals; aryl radicals such as the phenyl, xenyl, and naphthyl radicals; cyclohexyl radical; cycloalkenyl radicals such as the cyclohexenyl radical; aralkyl radicals such as the benzyl radical; alkaryl radicals such as the tolyl and xylyl radicals; and the corresponding substituted hydrocarbon radicals such as the chloropropyl and the 3,3,3-trifluoropropyl radicals. It is not critical for the purpose of this invention that the substituents be identical.

The hydrolyzable groups containing nitrogen, represented by Z, on the organic silicon compound can be represented by amino groups, aminoxy groups, oxime groups, amide groups, imide groups, and lactam groups, or their partially hydrolyzed condensation products. The substituents on the nitrogen functional hydrolyzable group do not appear to be critical for the purpose of this invention. The substituents can be hydrogens or monovalent hydrocarbon groups, such as the methyl, vinyl, phenyl, benzyl, tolyl, and 3,3,3-trifluoropropyl radicals. It is preferred that Z be a water hydrolyzable group selected from the group consisting of

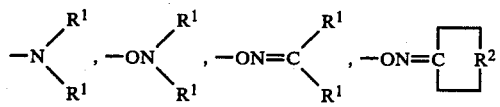

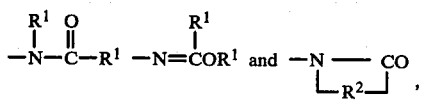

wherein R$^1$ is a hydrogen atom or a group selected from monovalent hydrocarbon groups and R$^2$ is an alkylene group.

Specific examples of the organic silicon compound, having the general formula R$_2$SiZ$_2$ wherein R is an unsubstituted or substituted monovalent hydrocarbon group, and Z is a hydrolyzable group containing nitrogen, include amino silanes such as (CH$_3$)$_2$Si[NH(C$_4$H$_9$)]$_2$, (CH$_3$)$_2$Si[NH(C$_6$H$_5$)]$_2$, (CH$_3$)$_2$Si[N(CH$_3$)$_2$]$_2$, (CH$_3$)(C$_6$H$_5$)Si[N(CH$_3$)$_2$]$_2$, (CH$_3$)(CH$_2$=CH)Si[N(CH$_3$)$_2$]$_2$, (C$_2$H$_5$)$_2$Si(NH$_2$)$_2$, aminoxy silanes such as (CH$_3$)$_2$Si[ON(CH$_3$)$_2$]$_2$,
(CH$_3$)(C$_6$H$_5$)Si[ON(CH$_3$)$_2$]$_2$, (CH$_3$)(CH$_2$=CH)Si[ON(CH$_3$)$_2$]$_2$,
(CH$_3$)$_2$Si[ON(CH$_3$)(C$_2$H$_5$)]$_2$, (CH$_3$)(CH$_2$=CH)Si[ON(C$_2$H$_5$)$_2$]$_2$, oxime silanes such as (CH$_3$)$_2$Si[ON=C(CH$_3$)$_2$]$_2$, (CH$_3$)(CH$_2$=CH)Si[ON=C(CH$_3$)$_2$]$_2$, (CH$_3$)$_2$Si[ON=C(CH$_3$)(C$_2$H$_5$)]$_2$, (CH$_3$)(C$_6$H$_5$)Si[ON=C(CH$_3$)(C$_2$H$_5$)]$_2$,

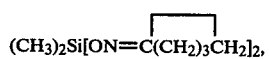

amide silanes such as

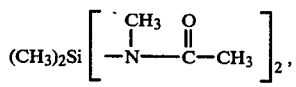

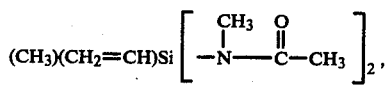

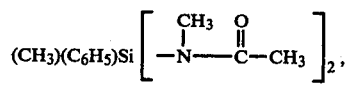

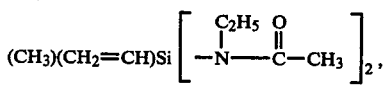

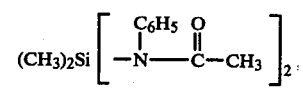

imide silanes such as

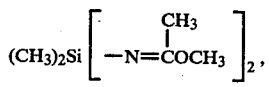

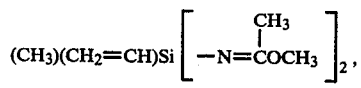

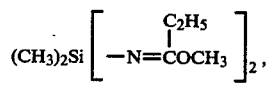

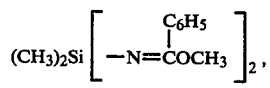

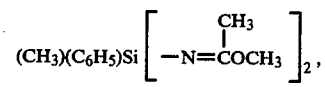

and lactam silanes such as

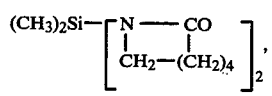

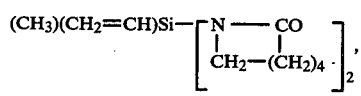

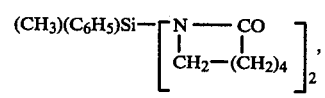

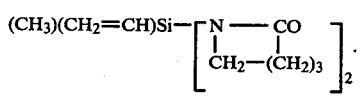

Component (B) is present in the range of 0.1 to 50 parts by weight per 100 parts by weight of Component (A). There is no problem at all if the viscosity increases to a certain degree with the addition of Component (B), but because there is a tendency to gel with a chain polymerization reaction, the amount of Component (B)

to be added should be selected with care. Therefore, it is preferred that the range be 1 to 10 parts by weight per 100 parts by weight of Component (A).

The silica, Component (C), used in the present invention is represented by fumed silica, silica aerogel, precipitated silica, quartz powder, fused silica, and calcined silica. In terms of defoaming effects, it is desirable that the surface area of the silica be greater than 100 m$^2$/g. If the amount of silica added is either excessive or inadequate, there is concern that the foam control will be insufficient, so it is present in the range of 1 to 50 parts by weight, preferably 3 to 20 parts by weight, per 100 parts by weight of Component (A).

A wide variety of methods for preparing the components of the present invention are well known in the art. A person of ordinary skill in the art would be capable of making the components useful in accordance with this invention by conventional techniques, especially in view of the disclosure provided in this application.

The foam control composition of the present invention is obtained by mixing components (A), (B), and (C). When mixing, heating and stirring for 2 to 3 hours at a temperature of 120° to 200° C. is desirable. It is desirable that the mixing apparatus be one in which mixing and heating can be done simultaneously. Also, the present composition may be treated with homogenizer, ball mill, colloid mill, 3 roll mill, etc., in order to make it fine and uniform. Reduced pressure operations and inert gases, such as nitrogen, may also be used as needed. In short, so long as mixing is uniform, any apparatus can be used.

The mixing method nor the order of mixing is not known to be critical for the purpose of this invention, but the following methods, for example, can be employed:

(1) the method of mixing components (A), (B), and (C) simultaneously;
(2) the method of mixing components (A) and (C) and forming a silicone compound, and then mixing component (B) in this;
(3) the method of preparing a solution of components (A) and (B) and then adding Component (C);
(4) the method of treating the silica powder in advance by mixing components (B) and (C), and then mixing with Component (A);
(5) the method of carrying out the mixings described in Methods (1) to (4) above in the presence of an organic solvent which is inactive with components (A), (B), and (C), or diluting the material mixed by methods (1) to (4) with an organic solvent; and
(6) the method of adding the material mixed in methods (1) to (4) described above to water and a surfactant and emulsifying it.

Methods (1) to (6) may be adopted arbitrarily according to the purpose for which it will be used, but the mixing method is not restricted only to methods described above.

Depending on the organic silicon compound, Component (B), employed, reaction with the hydroxyl groups or alkoxy groups which the organopolysiloxane, Component (A), contains and the hydroxyl groups which the silica, Component (C), contains may be slow, so conventionally well-known catalysts of organic metal compounds containing tin, zinc, iron, lead, titanium, etc., may be added to accelerate this reaction.

The foam control composition of the present invention can be used in various forms depending on the variety of the foam system. For example, when the foam system is an oil system or solvent system, it is possible to dilute the foam control composition with an organic solvent. The organic solvent referred to here is a conventional well-known liquid with a boiling point of 250° C. or below and is selected from hydrocarbon solvents, halogenated hydrocarbons, amines, alcohols, ethers, ketone, and esters. For example, methylcyclohexane, xylene, petroleum naphtha, perchloroethylene, bromochloroethane, dichlorobutane, triethylamine, butylamine, tributylamine, isopropyl alcohol, butyl alcohol, amyl alcohol, hexyl ether, butyl Cellosolve ($C_4H_9OCH_2CH_2OOCCH_3$), dioxane, methyl ethyl ketone, diethyl ketone, methyl butyl ketone, ethyl acetate, Cellosolve acetate ($CH_3COOCH_2CH_2OC_2H_5$), and ethyl propionate can be mentioned, but it is not limited to these.

When the foaming system is an aqueous system, it is possible to emulsify this composition using conventional well-known surfactants and water. The surfactant referred to here is represented, for example, by sorbitan aliphatic esters, glycerol aliphatic esters, propylene glycol aliphatic acid esters, polyoxyethylene aliphatic acid esters, polyoxyethylene sorbitan aliphatic acid esters, polyoxyethylene alkyl ethers, polyoxyethylene castor oil, ethylene oxide, and propylene oxide, but it is not limited to these. When emulsifying, protective colloid agents may be used, which produce thickening effects, stabilizing effects, and are dispersable or bondable. For example, methyl cellulose, milk sugar, sodium alginate, cane sugar aliphatic acid esters, tragacanth gum, polyvinyl alcohols, hydroxypropyl cellulose, carboxyvinyl polymers, etc., can be mentioned, but it is not limited to these.

Besides the organic solvents, water, surfactants, and protective colloid agents, mentioned above, the following may also be added to this composition: vegetable oils such as soybean oil, rapeseed oil, peanut oil, coconut oil, etc., polyethers, carboxylic acid esters, phosphoric acid esters, perfluorocarbons, aromatic chlorides, lauric acid, polyalkylene glycols, organosilanes other than component (B), organosiloxanes, aluminum hydroxide, calcium hydroxide, magnesium hydroxide, metal oxide micropowders, scale-shaped fillers, organopolysiloxane oils whose termini are closed with trimethylsilyl groups, hydrocarbon oils, animal fats, synthetic oils, etc.

The amount of the composition which is employed will depend on the particular systems in which foam is to be controlled and the extent to which the user wishes to control the foaming. The composition can be used as any kind of foam control agents, i.e., as defoaming agents and/or antifoaming agents. Defoaming agents are generally considered as foam reducers whereas antifoaming agents are generally considered as foam preventors. As noted, the composition can serve in either or both capacities.

Now in order that those skilled in the art may better understand how the present invention can be practices, the following examples are given by way of illustration and not by way of limitation. All parts referred to herein are by weight, and all viscosities are measured at 25° C., unless otherwise specified.

EXAMPLE 1

A test of durability was used to comparatively evaluate various foam control compositions. The test of durability is as follows:

1. Prepare a foaming solution consisting essentially of a 1.0% aqueous solution of the surfactant Octapol 100 (polyoxyethylene octylphenol ether) manufactured by Sanyo Kasei Kogyo.
2. Prepare a foam control solution by placing 0.40 grams of the foam control composition into a 100 ml measuring flask, and add tertiary butanol to the 100 ml mark.
3. Place 100 ml of the foaming solution and 1.0 ml of the foam control solution into a 300 ml covered glass bottle.
4. Forcibly foam the solution on a shaker.
5. Measure the time for the foam to disappear.
6. Continuously repeat steps 4 and 5 until more than 5 minutes are required for defoaming. The number of repetitions is the duration frequency.
7. Repeat steps 1 to 6, 15 times.

The compositions tested and results are:

TABLE I

| Composition and Results | FOAM CONTROL COMPOSITIONS | | | | | | | | | COMPARISON COMPOSITIONS | | |
|---|---|---|---|---|---|---|---|---|---|---|---|---|
| | I | II | III | IV | V | VI | VII | VIII | IX | X | XI | XII |
| Component (A) | | | | | | | | | | | | |
| Dimethylpolysiloxane having hydroxyl groups at both chain terminals and a viscosity of 2000 Cs | 100 | 100 | 100 | | | | | | | 100 | 100 | |
| Dimethylpolysiloxane having trimethylsilyl group at both chain terminals and a viscosity of 2000 Cs | | | | | | | | | | | | 100 |
| Dimethylpolysiloxane having hydroxyl groups at both chain terminals and a viscosity of 1000 Cs | | | | 100 | 100 | 100 | 100 | 100 | | | | |
| Dimethylpolysiloxane having hydroxyl and methoxy terminal groups and a viscosity of 3000 Cs | | | | | | | | | 100 | | | |
| Component (B) | | | | | | | | | | | | |
| Dimethyl bis (N—methyl-acetamide) silane | 1 | 3 | 5 | | | | | | 4 | | 3 | 3 |
| $(CH_3)_2Si\left[ON\diagup_{C_2H_5}^{CH_3}\right]_2$ | | | | 2 | | | | | | | | |
| $(CH_3)_2Si\left[N\diagup_{C_4H_9}^{H}\right]_2$ | | | | | 2 | | | | | | | |
| $(CH_3)_2Si\left[ON{=}C\diagup_{C_2H_5}^{CH_3}\right]_2$ | | | | | | 2 | | | | | | |
| $(CH_3)_2Si\left[\begin{array}{c}N{-}CO\\|\phantom{xx}|\\CH_2{-}(CH_2)_4\end{array}\right]_2$ | | | | | | | 2 | | | | | |
| $(CH_3)_2Si\left[N{=}\overset{CH_3}{\underset{}{C}}OCH_3\right]_2$ | | | | | | | | 2 | | | | |
| Component (C) | | | | | | | | | | | | |
| Syloid 266 - a wet method silica with a surface area of 300 m²/g | 5 | 5 | 5 | 5 | 5 | 5 | 5 | 5 | | 5 | | 5 |
| Aerogel 200 - a fumed silica with a surface area of 200 m²/g | | | | | | | | | 3 | | | |
| DURATION FREQUENCY | 15 | 15 | 15 | 15 | 15 | 15 | 15 | 15 | 15 | 7 | 5 | 7 |

Each of the foam control compositions tested in Example 1 were prepared by mixing the components at room temperature for 30 minutes using a Hobart mixer, and then at 150° C. for 2 hours using a mixing apparatus equipped with a stirring device and a heating apparatus. The Syloid 266 is manufactured by Fiji-Davison and the Aerogel 200 is manufactured by Nippon Aerodil.

EXAMPLE 2

A test of defoaming properties was used to comparatively evaluate various foam control composition emulsions.

The emulsions were prepared from Compositions II, IV, VI, IX, X, and XII from Example 1. Composition XIII, SH 5500 manufactured by Toray Silicone, was also tested. The emulsions were prepared by mixing for 20 minutes at 60° to 70° C. with a homogenizer 20 parts of the foam control composition, 3 parts of the surfactant Syran 60 (sorbitan aliphatic acid ester) manufactured by kao Atlas, 2 parts of the surfactant Atmul P403 (glycerol aliphatic acid ester) manufactured by Kao Atlas, and 75 parts water.

The test of defoaming properties is as follows:
1. Prepare a 1.0 weight percent aqueous solution (adjusted to pH 11 with potassium hydroxide) of the surfactant Octapol 100 (polyoxyethylene octyl phenyl ether) manufactured by Sanyo Kasei Kogyo.
2. Place 200 ml of the aqueous solution and 0.10 grams of the foam control compositions emulsion in a 1 liter measuring cylinder.
3. Blow air into the cylinder through a glass ball filter at a rate of 600 ml./min. and measure the time in minutes until the total volume of foam reaches 800 ml.

The results are as follows

|  | Time, minutes |
|---|---|
| Composition II emulsion | 25 |
| Composition IV emulsion | 24 |
| Composition VI emulsion | 21 |
| Composition IX emulsion | 22 |
| *Composition X emulsion | 6 |
| *Composition XII emulsion | 11 |
| *Composition XIII emulsion | 5 |

*Comparison compositions

That which is claimed:
1. A composition to control foaming consisting essentially of
   (A) 100 parts by weight of an organopolysiloxane having
      1. at least one terminal group selected from the group consisting of alkoxy and hydroxyl groups, and
      2. a viscosity range of 10 to 100,000 centistokes at 25° C.,
   (B) 0.1 to 50 parts by weight per 100 parts by weight of Component (A) of an organic silicon compound, having the general formula $R_2SiZ_2$, wherein R is an unsubstituted or substituted monovalent hydrocarbon group, and Z is a hydrolyzable group containing nitrogen, and
   (C) 1 to 50 parts by weight per 100 parts by weight Component (A) of a silica.
2. A composition as defined in claim 1 wherein Component (A), the organopolysiloxane, has a viscosity range of 100 to 10,000 centistokes at 25° C., and Component (C), the silica, has a surface area greater than 100 $m^2/g$.
3. A composition as defined in claims 1 or 2 wherein Component (B) is present in 1 to 10 parts by weight per 100 parts by weight Component (A), and Component (C) is present in 3 to 20 parts by weight per 100 parts by weight Component (A).

* * * * *

UNITED STATES PATENT AND TRADEMARK OFFICE
CERTIFICATE OF CORRECTION

PATENT NO. : 4,443,359

DATED : April 17, 1984

INVENTOR(S) : Hiroshi Shimizu et al.

It is certified that error appears in the above-identified patent and that said Letters Patent is hereby corrected as shown below:

Col. 2, Line 46   delete "of" insert --at--.

Col. 6, Line 59   delete "practices" insert --practiced--.

Col. 9, Line 17   delete "kao" insert --Kao--.

Signed and Sealed this

Eleventh Day of September 1984

[SEAL]

Attest:

GERALD J. MOSSINGHOFF

Attesting Officer      Commissioner of Patents and Trademarks